L. W. V. WILMS.
FOOT SUPPORT.
APPLICATION FILED JULY 28, 1916.
1,232,455.
Patented July 3, 1917.
3 SHEETS—SHEET 1.
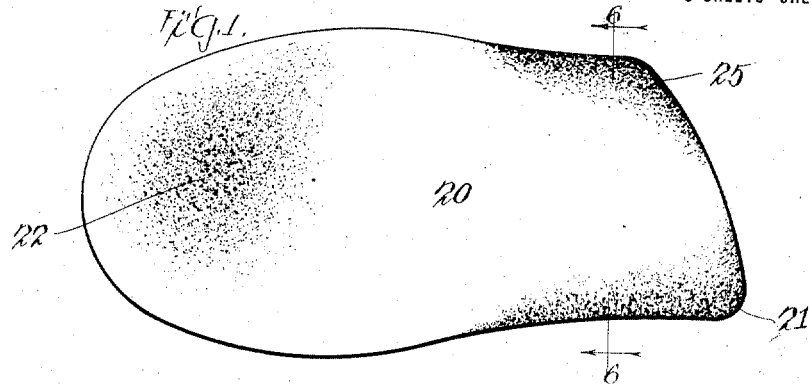
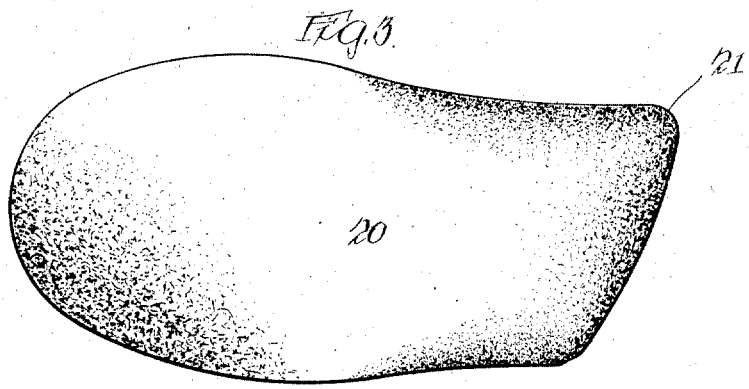
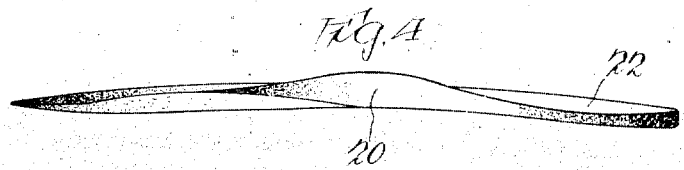
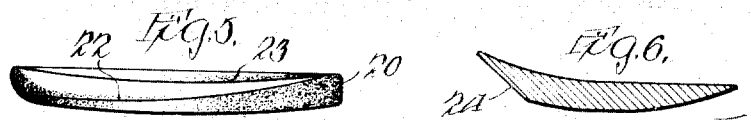
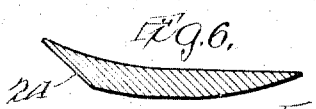

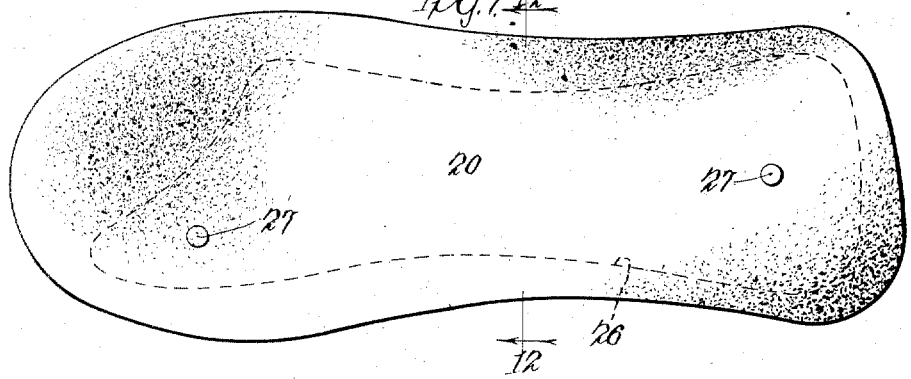
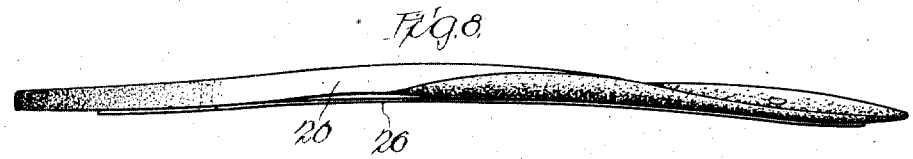
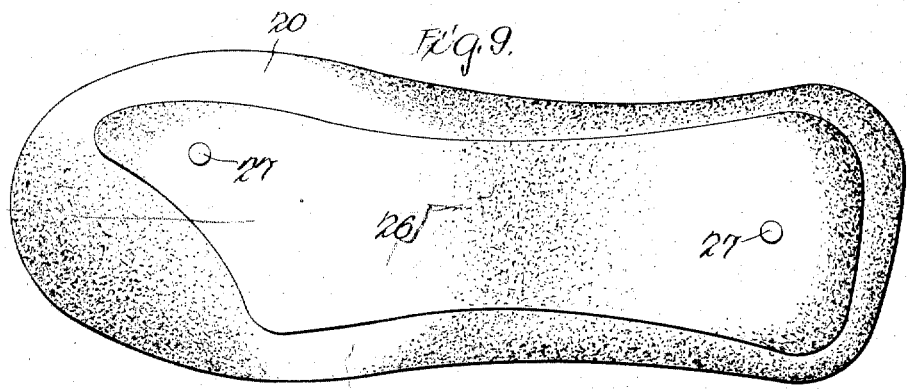
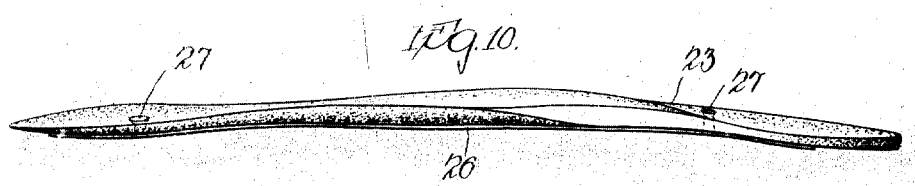
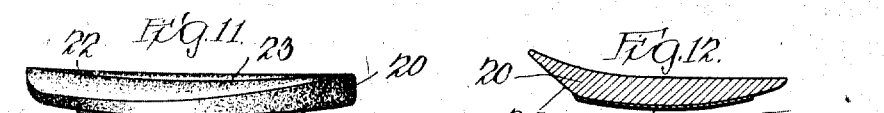

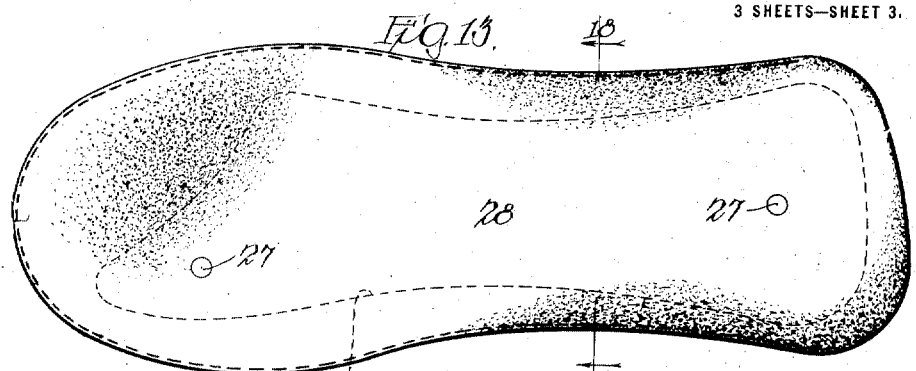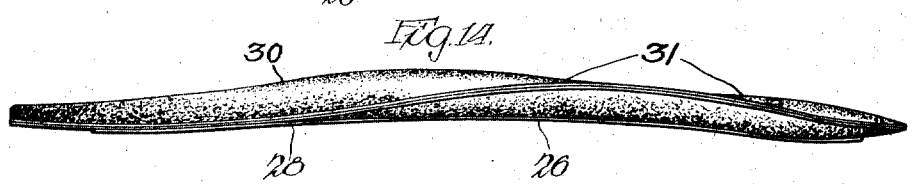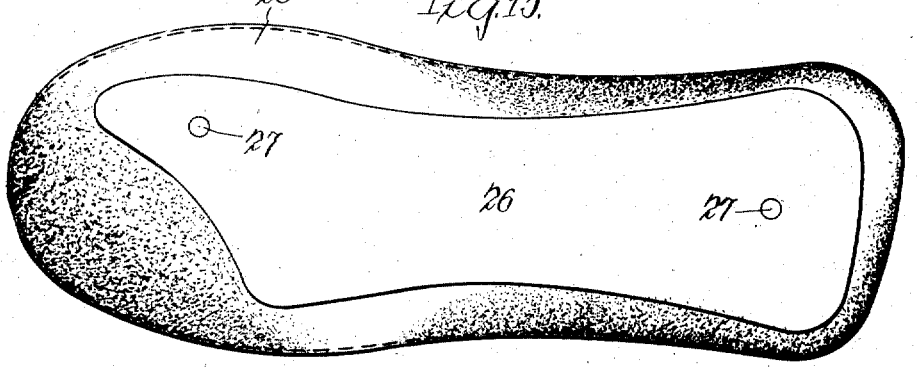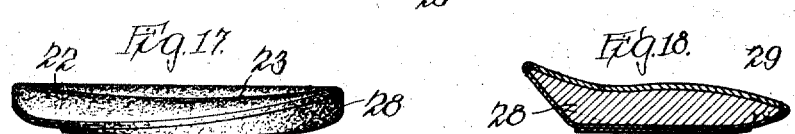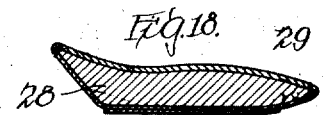

UNITED STATES PATENT OFFICE.

LEE W. V. WILMS, OF CHICAGO, ILLINOIS.

FOOT-SUPPORT.

1,232,455.  Specification of Letters Patent.  Patented July 3, 1917.

Application filed July 28, 1916. Serial No. 111,772.

*To all whom it may concern:*

Be it known that I, LEE W. V. WILMS, a citizen of the United States, and resident of Chicago, in the county of Cook and State of Illinois, have invented certain Improvements in Foot-Supports, of which the following is a specification.

This invention relates to certain new and useful improvements in a detachable or removable device to be worn within shoes or boots, mainly of the ordinary commercial or standard form, for the purpose of affording the greatest amount of comfort to the wearer, as well as, for correcting and preventing certain anatomical defects and unnatural, as well as, other objectionable tendencies of the feet, occasioned, in many instances, by the improper support for the various portions, muscles, ligaments, and bones of the feet, and it consists in the novel construction and adaptation of the various parts thereof, as will be hereinafter more fully set forth and specifically claimed.

The principal objects of my invention are to provide a heel balance that extends forward to support the entire os-calcis (heel bone), and other tarsal bones, thereby preventing and correcting weakened arches and insteps and all foot strain due to numerous causes.

Another object is to provide a heel balance in combination with an arch support for more severe cases of weakened arch and foot strain and flat-foot;

Also to provide a combination heel balance-arch and ball support for severe cases of fallen arch and instep, and a condition known as fallen transverse arch or metatarsalgia and "Morton's toe".

Still another object of my invention is to provide a heel balance and arch support that will provide means of support where support is necessary, namely, under the plantar surface of the foot instead of the inner lateral side, and thereby support the foot as nature intended it.

A further object of my invention is to provide a heel balance and arch support that will support and balance the heel or posterior pillar of the foot in incipient cases, and raise up the tilted os-calcis (heel bone), of the inclined plane and support the entire tarsal and also metatarsal bones.

Further objects of my invention are to give proper balance to the posterior pillar or os-calcis supporting the anterior portion thereof at its anterior inferior tubercle, also, supporting the same laterally on the inner and outer side and somewhat on the inner side of the arch, and extending forward to the ball of the foot, giving support at a point just back of the metatarsal heads.

In order to enable others skilled in the art to which the invention pertains to make and use the same, I will now proceed to describe it, referring to the accompanying drawings, in which—

Figure 1 is a top plan view of a heel balance and support for the posterior arch of the foot.

Fig. 2 is a view in elevation of the inner edge of the device, but in a reversed position.

Fig. 3 is a bottom or reverse plan view from that shown in Fig. 1.

Fig. 4 is a view in elevation of the outer edge of the device.

Fig. 5 is a rear end view of Fig. 1.

Fig. 6 is a cross-sectional view taken on line 6—6 of Fig. 1 looking in the direction indicated by the arrows.

Fig. 7 is a top plan view of a modification in the construction of the device, which is for the purpose of balancing the heel and supporting the longitudinal arch of the foot.

Fig. 8 is a view in elevation of the inner edge thereof, but in a reversed position.

Fig. 9 is a bottom or reverse plan view from that shown in Fig. 7.

Fig. 10 is a view in elevation of the outer edge thereof.

Fig. 11 is a rear end view of Fig. 7.

Fig. 12 is a cross-sectional view taken on line 12—12 of Fig. 7, looking in the direction indicated by the arrows.

Fig. 13 is a top plan view of another modified form of the device which is to be used for balancing the heel, supporting the arch and supporting the transverse arch at the metatarsal heads.

Fig. 14 is a view in elevation of the inner edge thereof, but in a reversed position.

Fig. 15 is a bottom or reverse plan view from that shown in Fig. 13.

Fig. 16 is a view in elevation of the outer edge thereof.

Fig. 17 is a rear end view of Fig. 13, and

Fig. 18 is a cross-sectional view taken on line 18—18 of Fig. 13, looking in the direction indicated by the arrows.

Like numerals of reference refer to corresponding parts throughout the different views of the drawings, in which it will be seen and understood that the devices shown therein are all for the left foot, it being deemed unnecessary to show the devices for the right foot, as they would be the same as those shown, except that the parts thereof would be located in the opposite directions or reversely.

Referring now to Figs. 1 to 6 inclusive of the drawings, the device consists of an elongated piece 20 of leather or other suitable material, which has its rear portion rounded and its front portion terminating in a line diagonally across said piece, thus affording an extension 21 which projects, when in place in a shoe, under the arch of the foot. The upper surface of the heel portion of the piece 20 is provided with a cavity or depression 22, which is more clearly shown in Fig. 5, and as therein illustrated, extends slopingly from the inner edge of the heel portion of the piece 20 to near the outer edge of said part, thus forming a pocket or cavity 22 with its deepest portion near the outer edge of the piece 20 or heel balance. When thus formed with the cavity or pocket 22, it is obvious, that the thicker portion of the heel part of the piece 20 will be located at the inner edge of said piece, and by reference to Fig. 5, it will be seen that the lower surface of the heel portion of the piece is slightly downwardly curved.

The bottom of the cavity 22 is concaved and is slightly raised or inclined upwardly to a point a slight distance in front of the front portion of the heel of the wearer, as at 23, see Fig. 5 of the drawings. The front portion of the piece 20 is skived on its inner lower surface as at 24, see Fig. 2, and said front portion of the piece 20 is tapered toward its end to substantially a knife edge. By this construction of the portions of the piece 20 it is obvious that a slight depression 25 will be provided at the outer portion of said piece.

In Figs. 7 to 12 inclusive, is shown a modification in the construction of the device, which modified form is particularly intended for balancing the heel and supporting the longitudinal arch of the foot, and consists in making the piece 20 considerably longer than in the other construction and in placing and securing, on the lower surface of the piece 20, a resilient plate or piece of metal 26, by preference, of substantially the shape shown by dotted lines in Fig. 7 and by continuous lines in Fig. 9. In this modification the piece 20 is practically of the same construction as that shown in Figs. 1 to 6 inclusive, with the addition of an extension of said piece at its forward end and with the addition of the resilient metal plate 26, which may be secured to the piece 20 by means of rivets 27, located at points about as shown.

In Figs. 13 to 18 inclusive, is shown another modification in the construction of the device, which is particularly intended for balancing the heel, supporting the arch and the transverse arch at the metatarsal heads, and it consists in the employment of a pad of cushioning material 28 of substantially the same shape in outlines as the piece shown in Figs. 7 and 9 inclusive.

In the modification now under consideration, the body or piece 28 of cushioning material is by preference, covered both above and below with leather 29 or any other suitable kind of lining, and said piece or body has secured to its lower surface a resilient metal body 26 of substantially the same construction as that employed in the modified form of the device, shown in Figs. 7 to 12 inclusive. In the present modified construction, the piece or body 28 is provided with a longitudinally extended and transversely arched portion 30 on its upper surface, which portion extends from the front part of the heel to a point near the front part of the metatarsal arch of the foot as will be readily understood by reference to Fig. 14 of the drawings, in which figure it will be seen that the arched portion 30 is depressed as at 31, from a point immediately forward of the tarso-metatarsal articulation to a point just back of the metatarsal heads of the foot.

The heel balance shown in Figs. 1 to 6, inclusive, by its special construction and contour, when worn in regular stock or made to order boots or shoes will prevent running over of the heel outwardly, by giving elevation to the inner portion and permitting the outer portion of the heel to rest in cavity or depression 22, thereby taking off just sufficient pressure on the outer and rear portion of the heel of the boot or shoe to prevent wearing, and thus causing it to balance evenly on heel and to wear the heel straight.

The heel balance and arch support, shown in Figs. 7 to 12, inclusive, by its special construction and contour, when worn in regular stock or made to order boots or shoes, will prevent running over of the heel outwardly by giving elevation to the inner portion and permitting the outer portion of the heel to rest in cavity or depression 22, thereby taking off just sufficient pressure on the outer and rear portion of the heel of the boot or shoe to prevent wearing and thus causing it to balance evenly and to wear the heel straight.

The heel balance arch and ball support shown in Figs. 13, to 18 inclusive, by its special construction and contour, when worn in regular stock or made to order boots or shoes will prevent running over of the heel outwardly, by giving elevation to the inner portion and permitting the outer portion of the heel to rest in cavity or depression 22, thereby taking off just sufficient pressure on the outer and rear portion of the heel of the boot or shoe to prevent wearing, and thus causing it to balance evenly on heel and to wear the heel straight.

By supporting the inner tubercle of the os-calcis and permitting the outer tubercle and fleshy part of the heel to rest in the depression 22, and by giving support by slight raise or upward incline of the heel balance as at 23, under anterior portion of the os-calcis and other tarsal bones, support is hereby derived that will also prevent and relieve arch strain and give support to the posterior arch sustaining the posterior pillar of the arch of the foot and thereby prevent more serious trouble and discomforts and correct acquired and traumatic heel and arch trouble, and support the entire longitudinal arch and cause action of certain muscles that practically lie dormant and become atrophied from want of use, and by stimulating muscular action in the plantar surface (the sole of the foot) will stimulate circulation of the blood supply in the foot, and at the same time, prevent and gradually correct deformities of the foot, such as foot-strain, ruptured ligaments, or fallen arches, both longitudinal and transverse and acquired or traumatic flat-foot, and metatarsalgia and Morton's toe. This support is specially designed to sustain the entire under surface of the human foot in a way as nature would sustain it if we walked on mother earth without shoes as nature intended and thereby causing action of the plantar muscles and supporting the entire tarsal bones as well as the metatarsals well forward to their articulations with the phalanges.

The depression 31, takes place at the plantar arch so as not to interfere with the finer structures of the foot at this point, namely, to impair the circulation at the dorsalis pedis artery, or cause pressure at the arch of the external plantar nerve, both of which run transversely at this point.

The raised pad just ahead of the depression 31, supports the anterior transverse or metatarsal arch just back of the metatarsal heads supporting the entire metatarsal arch and particularly the 2nd, 3d, and 4th metatarsal bones.

The metal arch plate used in the construction shown in Figs. 7 to 12 inclusive and in Figs. 13 to 18 inclusive is made of material which is both somewhat ductile and resilient, so that said plate can be given the desired amount of arch or other shape to follow the proper contour of the foot and to permit adjustment of the plate as the deformity of the foot is gradually improved or corrected. This plate can be shaped so as to give more support to any desired portions of the plantar surface of the foot and also to relieve or take away pressure as desired so as to give perfect comfort to the wearer.

Having thus fully described the invention, what I claim as new and desire to secure by Letters Patent is—

1. A device of the character described, consisting of an elongated piece or insert for foot wear having in the upper surface thereof near its heel end a cavity increasing in depth from near the inner edge of said piece to near its outer edge, said cavity being mainly located rearwardly of a transverse line near the anterior portion of the os-calcis of the foot, to receive the os-calcis and fleshy part of the heel.

2. A device of the character described, consisting of an elongated piece or insert for foot-wear having in the upper surface thereof near one of its ends a cavity increasing in depth from near the inner edge of said piece to near its outer edge, the said cavity having a forwardly and upwardly inclined surface adapted to extend to or under the anterior portion of the os-calcis and other tarsal bones of the foot.

3. A device of the character described, consisting of an elongated piece or insert for foot-wear having in the upper surface thereof near one of its ends a partially concave cavity increasing in depth from near the inner edge of said piece to near its outer edge, the said cavity having a forwardly and upwardly inclined surface adapted to extend to or under the anterior portion of the os-calcis and other tarsal bones of the foot.

4. A device of the character described, consisting of an elongated piece or insert for foot-wear having in the upper surface thereof near one of its ends a cavity increasing in depth from near the inner edge of said piece to near its outer edge, the said piece being of sufficient length to extend to and under the anterior portion of the os-calcis and other tarsal bones and terminating at its front end diagonally from the outer edge to the inner edge of said piece, said cavity having a forwardly and upwardly inclined surface.

5. In a device of the character described, the combination with an elongated piece or insert for footwear having in the upper surface thereof near one of its ends a cavity increasing in depth from near the inner edge of said piece to near its outer edge, of a resilient metal arch plate mounted longitudinally on the lower surface of said piece or insert and being slightly upwardly arched, the said plate being secured to the said piece near each of its ends, the said cavity having a forwardly and upwardly inclined surface extended from about its center, the said insert also having a depression at its outer edge near its front end and forwardly and inwardly tapered at its inner front portion.

6. In a device of the character described, the combination with an elongated piece or insert for foot-wear made of cushioning material and having in the upper surface thereof, near one of its ends a cavity increasing in depth from near the inner edge of said piece to near its outer edge, the said cavity having a forwardly and upwardly inclined surface extended from its center, the said piece having its upper portion arched both longitudinally and transversely, and provided in the front of said arched portion with a depression, of a resilient arch plate mounted longitudinally on the lower surface of the said piece and secured thereto near each of its ends, the said plate being slightly upwardly arched.

7. In a device of the character described, the combination with an elongated piece or insert, for foot-wear having in the upper surface thereof, near one of its ends a cavity increasing in depth from near the inner edge of said piece to near its outer edge, and a bendable resilient metal arch plate mounted longitudinally on the lower surface of said piece or insert and being slightly upwardly arched, the said plate being secured to the said piece near each of its ends, the said cavity having a forwardly and upwardly inclined surface extending from about its center, the said insert also having a depression at its outer edge near its front end and forwardly and inwardly depressed at its inner portion.

8. In a device of the character described, the combination with an elongated piece or insert for foot-wear having in the upper surface thereof near one of its ends a cavity increasing in depth from near the inner edge of said piece to near its outer edge, the said cavity having a forwardly and upwardly inclined surface extending from about its center, the said insert also having a depression at its outer edge near its front end and forwardly and inwardly depressed at its inner portion.

LEE W. V. WILMS.

Witnesses:
 CHAS. C. TILLMAN,
 LYLLIAN PUZICK.